Nov. 15, 1955 G. PAILLARD 2,723,430
DEVICE FOR REMOVABLY SECURING A LOOP
STRAP TO A PHOTOGRAPHIC CAMERA
Filed May 28, 1951 2 Sheets-Sheet 1
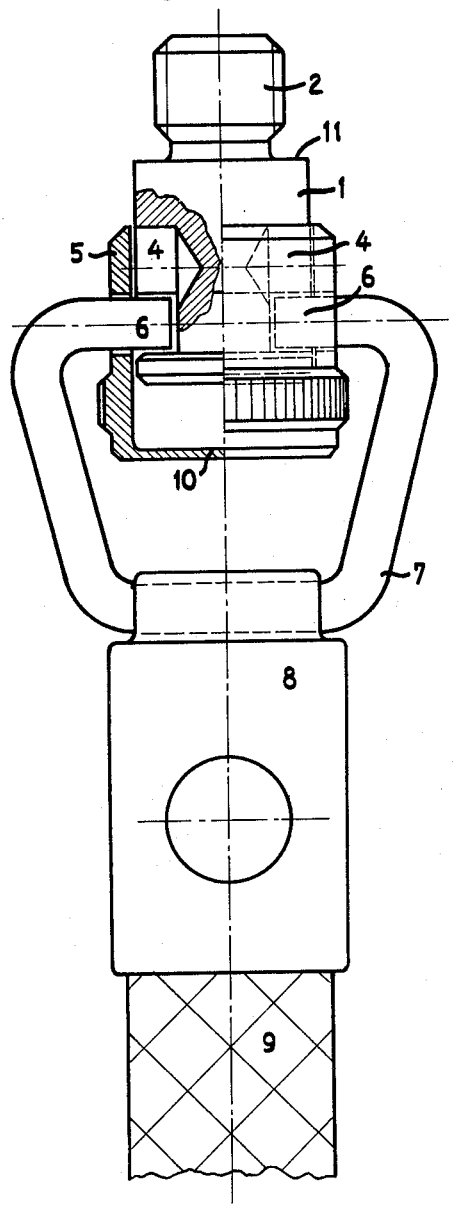
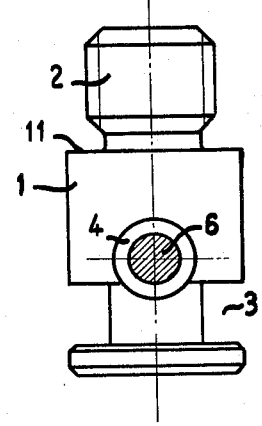
INVENTOR
*Gaston Paillard.*
BY
ATTORNEY Nov. 15, 1955     G. PAILLARD     2,723,430
DEVICE FOR REMOVABLY SECURING A LOOP
STRAP TO A PHOTOGRAPHIC CAMERA
Filed May 28, 1951     2 Sheets-Sheet 2
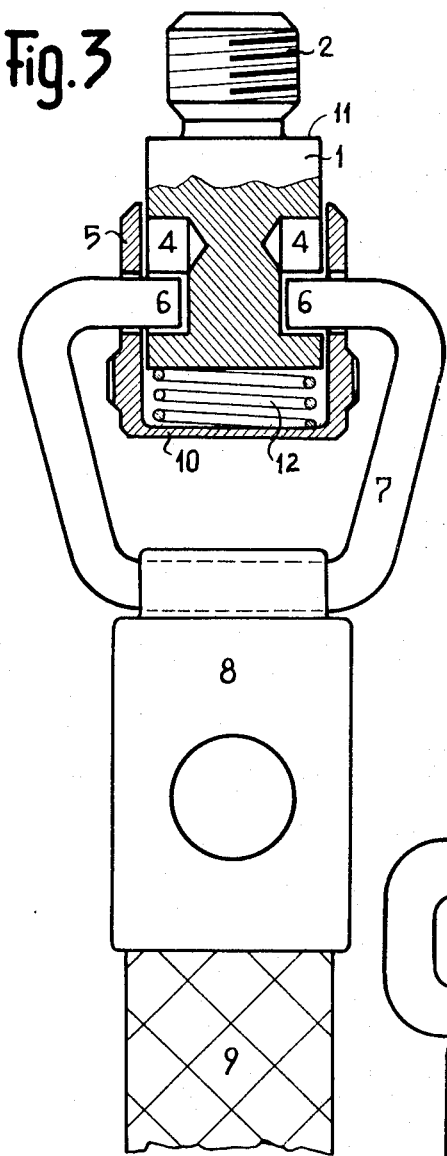
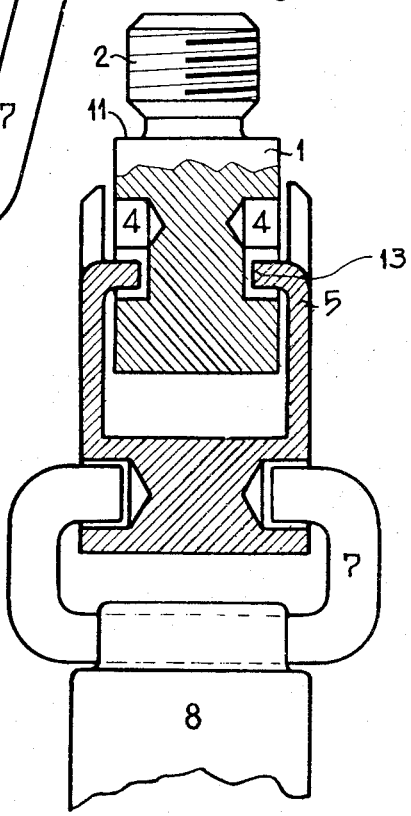
INVENTOR
GASTON PAILLARD
BY Emory L. Groff
Attorney

United States Patent Office 2,723,430
Patented Nov. 15, 1955

2,723,430

DEVICE FOR REMOVABLY SECURING A LOOP STRAP TO A PHOTOGRAPHIC CAMERA

Gaston Paillard, Sainte-Croix, Switzerland, assignor to Paillard S. A., Sainte-Croix, Switzerland, a company of Switzerland Application May 28, 1951, Serial No. 228,554

Claims priority, application Switzerland June 5, 1950

2 Claims. (Cl. 24—73)

The use of a loop strap for facilitating the transport of a photographic camera is known.

The present invention has for its subject a securing device for securing removably a loop strap to a photographic camera having a threaded bore. This threaded bore is usually used in conjunction with a tripod, having a threaded member adapted to be screwed in the said bore, or, alternatively, a loop strap carrying member may be screwed in said bore, said carrying member having a ring and said ring being so mounted as to be capable of pivoting co-axially on the said member.

Known securing devices of this latter type do not always ensure a satisfactory securing of the loop strap to the camera. In fact, the loop unscrews too easily and is thus liable to become disengaged from the camera so that the camera may fall and be damaged.

The device according to the invention is characterised in that means are provided for locking the ring on the screwed member for the purpose of enabling it to be used as a wrench for screwing and unscrewing the said member into and out of the threaded bore.

One form of construction of the subject of the invention is shown by way of example in the accompanying drawings, wherein:

Fig. 1 is a view of the whole arrangement, the securing device being shown partly in section.

Fig. 2 shows the screwed member.

Figures 3 and 4 are views, partly in section, showing modifications of the securing device shown in Figure 1.

The member 1, carrying a screwed portion 2 of a size corresponding with the screwed bore of the photographic camera, has a circular groove 3. Two diametrically oppositely located sockets 4 are provided in this member against the edge of the groove 3, which is located towards the screwed portion 2.

A sleeve 5 partly covers the screwed member 1, and has two oppositely located bores, into which pass prongs which are the ends 6 of a yoke 7 serving to secure the loop strap 9 by means of a sleeve 8. The ends 6 of the yoke 7 enter the groove 3 in such a manner as to define the axial position of the sleeve 5 whilst enabling it to pivot co-axially relatively to the screwed member 1. When it ends 6 are opposite the sockets 4, the sleeve 5 may be moved axially in such a manner that they enter the sockets 4. In this position, the yoke 7 and the sleeve 5 cannot pivot about the screwed member 1, which thus enables the user to screw the loop strap to the camera whilst using the yoke 7 as a winged wrench and thus obtaining an efficient tightening, practically eliminating the risk of accidental unscrewing. The fact that it is possible to use the yoke for securing the loop strap guarantees in fact a good locking, as the fingers have a better grip and act on a larger diameter than is the case of a milled knob, for example. The locking efficiency may also be increased by the interposition of a resilient washer between the apparatus and the shoulder 11 of the member 1.

When the apparatus is carried by the loop strap, its weight disengages the ends 6 from the sockets 4, and retains them in the groove 3, so that the camera can pivot freely relatively to the loop strap, without causing unscrewing of the screwed member 1.

It is also possible to place a coiled spring 12 between the bottom 10 of the sleeve 5 and the screwed member 1, in order that for all positions of the camera, the ends 6 are held in the groove 3.

In a modification, the sleeve 5 may have one or more internal projections 13 instead and in place of the ends 6 of the yoke 7. The latter may then be secured to the end of the sleeve 5.

I claim:

1. A carrying attachment for a camera of the type having a connector therein, said carrying attachment comprising a cylindrical member having attaching means adjacent one end adapted to cooperate with said connector, said cylindrical member having in its periphery an annular groove, said cylindrical member having in its periphery sockets opening into said annular groove, a sleeve surrounding a portion of said cylindrical member, said portion including said annular groove, said sleeve having apertures therein, a carrying yoke, said yoke having prongs projecting through said apertures into said annular groove, whereby said prongs may be moved into said sockets and the yoke and cylindrical member will move as a unit.

2. The device according to claim 1 and resilient means interposed between said cylindrical member and said sleeve, said resilient means acting to retain said prongs in said annular groove.

References Cited in the file of this patent

UNITED STATES PATENTS

| | | |
|---|---|---|
| 580,214 | Marvel | Apr. 6, 1897 |
| 970,793 | Carlson | Sept. 20, 1910 |
| 1,299,764 | Normoyle | Apr. 8, 1919 |
| 2,130,262 | Burlin | Sept. 13, 1938 |
| 2,390,792 | Jespersen | Dec. 11, 1945 |
| 2,603,325 | Pickard | July 15, 1952 |

FOREIGN PATENTS

| | | |
|---|---|---|
| 936 | Great Britain | Jan. 14, 1907 |
| 567,933 | Great Britain | Mar. 8, 1945 |